("12") United States Patent  
Robert

(10) Patent No.: US 9,457,628 B2  
(45) Date of Patent: Oct. 4, 2016

(54) METHOD OF MANUFACTURING AN ELECTRONIC DEVICE FOR A PNEUMATIC TYRE

(75) Inventor: Michel Robert, Cellule (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1036 days.

(21) Appl. No.: 13/516,926

(22) PCT Filed: Dec. 20, 2010

(86) PCT No.: PCT/FR2010/052828  
§ 371 (c)(1),  
(2), (4) Date: Aug. 7, 2012

(87) PCT Pub. No.: WO2011/073601  
PCT Pub. Date: Jun. 23, 2011

(65) Prior Publication Data  
US 2012/0305151 A1   Dec. 6, 2012

(30) Foreign Application Priority Data  
Dec. 18, 2009   (FR) ...................................... 09 59244

(51) Int. Cl.  
*B60C 23/04* (2006.01)  
*B29C 45/14* (2006.01)  
(Continued)

(52) U.S. Cl.  
CPC ..... *B60C 23/0493* (2013.01); *B29C 45/14639* (2013.01); *B60C 23/0452* (2013.01); *H01Q 1/2241* (2013.01); *B29D 2030/0077* (2013.01); *Y10T 29/49117* (2015.01)

(58) Field of Classification Search  
CPC .......... B60C 23/0452; B60C 23/0493; B60C 23/0491; H01Q 1/2241; B29D 45/14639  
See application file for complete search history.

(56) References Cited

U.S. PATENT DOCUMENTS 5,500,065 A * 3/1996 Koch et al. .................... 156/123  
6,543,277 B2 * 4/2003 Koch et al. ................. 73/116.01  
(Continued)

FOREIGN PATENT DOCUMENTS

DE   102007001279   *  7/2008  
EP    1 589 614 A1    10/2005  
(Continued)

OTHER PUBLICATIONS

Notification of Reason for Rejection issued by the JPO on Oct. 27, 2014, in connection with Japanese Application No. 2012-543886 (in Japanese with English translation provided herewith).

*Primary Examiner* — Justin Fischer  
*Assistant Examiner* — Robert Dye  
(74) *Attorney, Agent, or Firm* — Fitzpatrick, Cella, Harper & Scinto

(57) ABSTRACT

An electronic device, which is intended to be incorporated into a tire, includes an electronic comprises, a conductor, and a support for the electronic component. The support and the conductor are joined together by a first part for attachment of the support and a second part for attachment of the conductor. A rigidifying casing of the device is overmoulded over at least the first part for attachment of the support and the second part for attachment of the conductor. At least one intermediate transition layer is at least partially overmoulded over the rigidifying casing.

15 Claims, 5 Drawing Sheets

(51) Int. Cl.
*H01Q 1/22* (2006.01)
*B29D 30/00* (2006.01)

(56) References Cited

U.S. PATENT DOCUMENTS

| | | | |
|---|---|---|---|
| 7,810,387 B2 | 10/2010 | Robert | 73/146 |
| 2004/0174690 A1 | 9/2004 | Moll et al. | 361/813 |
| 2005/0088361 A1 | 4/2005 | Kelly et al. | 343/873 |
| 2005/0132787 A1 | 6/2005 | Benedict et al. | 73/146 |
| 2006/0038665 A1* | 2/2006 | Jang | 340/426.33 |
| 2007/0274030 A1* | 11/2007 | Robert | 361/679 |
| 2008/0142150 A1 | 6/2008 | Robert | 156/117 |
| 2010/0276563 A1* | 11/2010 | Cubizolle et al. | 248/633 |

FOREIGN PATENT DOCUMENTS

| | | |
|---|---|---|
| EP | 1 858 121 A1 | 11/2007 |
| JP | 2005-178753 A | 7/2005 |
| JP | 2009-260684 A | 11/2009 |
| WO | WO 94/18700 A1 | 8/1994 |
| WO | WO 99/53740 A1 | 10/1999 |
| WO | WO2009056740 * | 5/2009 |

\* cited by examiner

Fig. 2
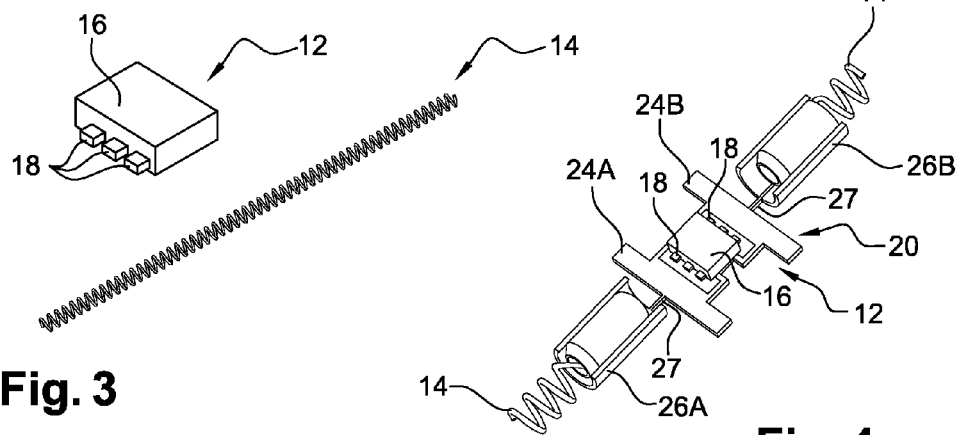
Fig. 3
Fig. 4
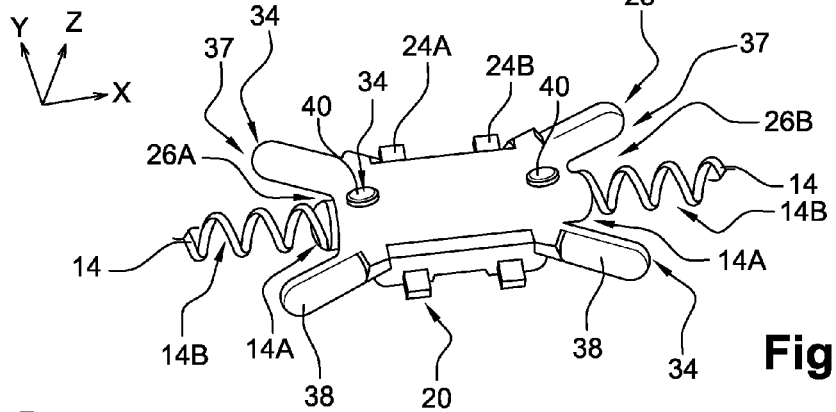
Fig. 5
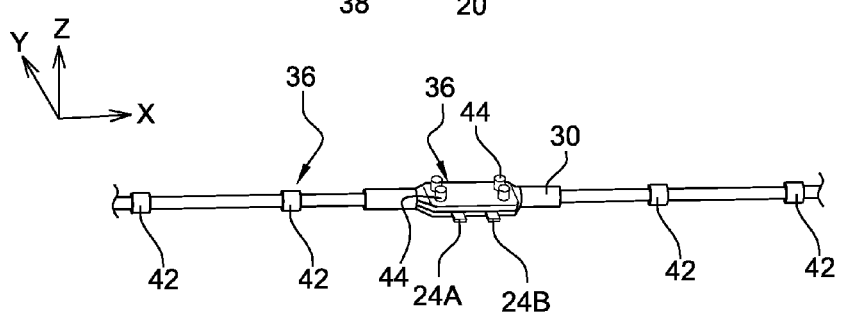
Fig. 6

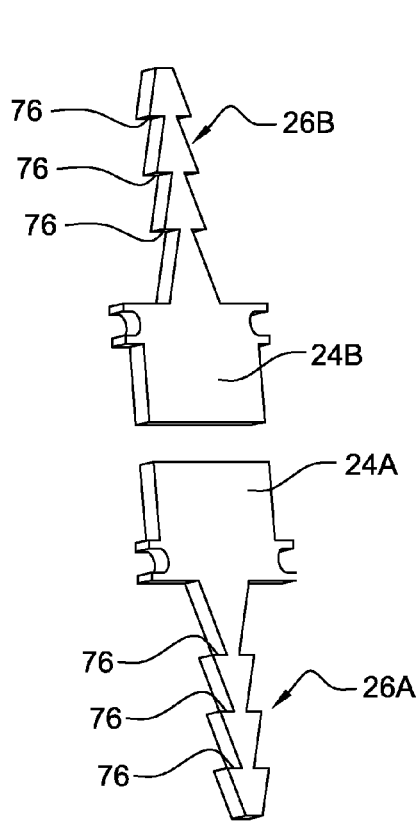
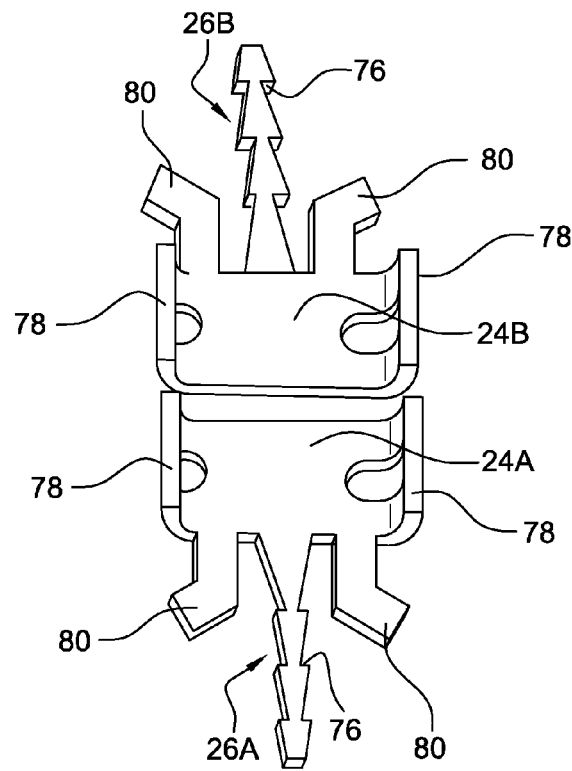
Fig. 14A    Fig. 14B
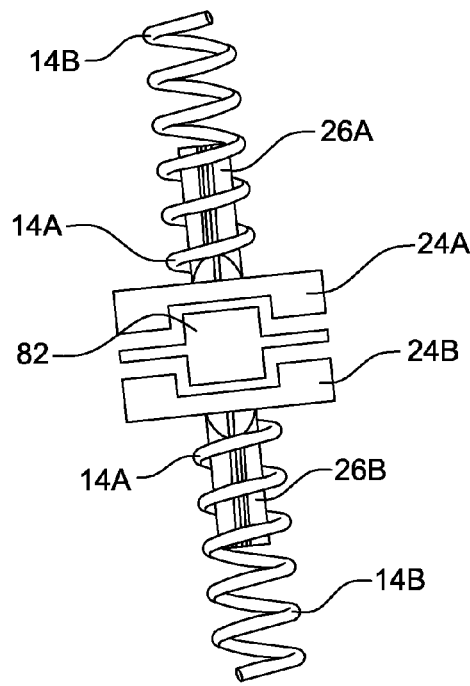
Fig. 14C

METHOD OF MANUFACTURING AN ELECTRONIC DEVICE FOR A PNEUMATIC TYRE

FIELD OF THE INVENTION

The present invention relates to the technical field of tyres.

It is applicable to any type of vehicle tyre. The invention relates more specifically to tyres intended to be fitted to motor vehicles of the passenger car, SUV (sport utility vehicle) or two-wheeled type, for example motorbikes, aircraft, or equally industrial vehicles chosen from vans, heavy vehicles such as metro rolling stock, buses, heavy road transport vehicles, for example trucks, tractors, trailers and off-road vehicles such as agricultural machinery or construction plant or even other transport or handling vehicles.

BACKGROUND

A tyre is manufactured from a collection of semi-finished rubber products in the form of strips, sheets or profiled elements, which may or may not be reinforced, and that are superposed on one another to form a green tyre. Once built, this green tyre is vulcanised in a mould to give a tyre.

The prior art, notably EP 1 858 121, already discloses a tyre containing an electronic device. The electronic device comprises a passive transponder connected to a dipole antenna made up of two strands able to communicate via radiofrequency waves with an external interrogation unit. This type of transponder is generally denoted by the English-language acronym RFID. Such a device is able to store data, for example relating to the identification of the tyre. The electronic device is positioned in the green tyre at an interface between two plies of rubber and is then embedded in the rubber during the vulcanising of the tyre.

The device comprises a PCB (Printed Circuit Board) support comprising a part for attachment of the transponder. The support also comprises an attachment part for each of the strands of the antenna. To manufacture the device, the transponder and one end of each of the two strands of the antenna are positioned on the parts for attachment of the support then the electrical connections are made by soldering these various components together.

Furthermore, once embedded in the rubber of the vulcanised tyre, the electronic device is subjected to local deformations caused by the running of the tyre. These local deformations lead to stresses at the interface. Because of these stresses, the strands break, notably at the joint between the strand and the support. Now, these broken strands have sharp edges or protruding ends which may prove detrimental to the mechanical endurance of the tyre and the safety of the user thereof.

BRIEF DESCRIPTION OF THE INVENTION

It is an object of the invention to improve the mechanical endurance and the user-safety of a tyre containing an electronic device.

To this end, the subject of the invention is an electronic device intended to be incorporated into a tyre, comprising an electronic component, at least one conductor and a support for the electronic component, the support and the conductor being joined together by a part for attachment of the support and a part for attachment of the conductor, the device additionally comprising:

- a rigidifying casing overmoulded at least over the part for attachment of the support and the part for attachment of the conductor,
- at least one intermediate transition layer at least partially overmoulded over the rigidifying casing.

Thanks to the protective casing, each conductor is held on the support. The attachment of each conductor is therefore made more reliable. Further, even in the event of failure of the attachment between conductor and support, the casing on the one hand holds these together and on the other hand electrically connects them via the support.

For preference, the casing is made of a material of a rigidity very much higher than that of the rubber of the tyre in which the device is intended to be incorporated. This material is compatible with each conductor and the support can be injection moulded. The material from which the casing is moulded is also compatible with the vulcanising temperature (between 160 and 200° C.) and the curing time (approximately 10 minutes for a tyre for a light vehicle). Further, the material of the casing is compatible with the temperatures at which the tyre will be used (between −40 and +100° C.). Finally, the material does not degrade over time.

The material of the intermediate transition layer has a rigidity that is intermediate between the rigidity of the casing and the rigidity of the rubber of the tyre into which the device is intended to be incorporated. The rigidity is characterized, for example, by the 10% elongation modulus of the material concerned.

In general, an interface between materials having different rigidities forms a critical zone. Thus, as the tyre is driven along, each of the materials the junction of which defines the interface is subjected to stresses. These stresses give rise to different deformations that are dependent on the nature and orientation of the materials of which the junction defines the interface. These differences in deformation cause shearing forces at the interface, hence the critical nature of the interface between these different materials. By reducing these differences the mechanical endurance of the electrical connections between the antenna, the support and the electronic component is therefore improved, thus improving the overall reliability of the device within the tyre.

The intermediate transition layer allows a progressive variation in rigidity between the support and the conductor, the protective casing and the rubber of the tyre. Thus, the smaller the difference in rigidity between the device and the rubber plies, the less critical the interface between the device and the rubber plies becomes.

The intermediate transition layer is made of a material that is not as rigid as the material of the protective casing. This material is compatible with the material of the protective casing, can be injection moulded and is compatible with the curing and service temperatures of the tyre. Finally, this material does not degrade over time.

Advantageously, the rigidifying casing is fully overmoulded over the support and the electronic component.

According to optional features of the device:

the elastic modulus of the material of the rigidifying casing is greater than or equal to 1000 MPa.

the 10% elongation modulus of the material of the transition layer is between 20 and 80 MPa.

Advantageously, the device comprises at least one interface layer at least partially overmoulded over the intermediate transition layer.

The interface layer further reduces the difference in rigidity between the device and the rubber of the tyre. This then improves the progressiveness of the transition in rigidity between, on the one hand, the electronic component and the conductors and, on the other hand, the rubber of the tyre.

The interface layer is made of a material that is not as rigid as the material of the intermediate layer. This material is compatible with the material of the intermediate layer, can be injection moulded and is compatible with the curing and service temperatures of the tyre. Further, this material is compatible with the rubber of the green tyre and with the vulcanised rubber, notably in terms of adhesion, mechanical properties, and how it evolves over time.

For preference, the 10% elongation modulus of the material of the interface layer is below 10 MPa.

Advantageously, the rigidifying casing comprises means for centering the device in an overmoulding cavity used for overmoulding the intermediate transition layer.

These centering means also provide control over the evenness of the thickness of the intermediate transition layer. Thus, the thickness is constant around the conductor allowing the radiating pattern of the conductor to be uniform and therefore more effective. Further, that makes it possible to provide a progressive transition in rigidity that is consistent for the entire conductor and the electronic component, thus improving the mechanical endurance of the tyre.

Finally, because the casing incorporates the means of centering the device, there is no need to provide external centering means when manufacturing the device.

For preference, the protective casing comprises means of protecting each conductor comprising two lugs arranged in an overall V-shape on each side of the part for attachment of the conductor to the support.

Advantageously, the means of centering the device in the cavity used for overmoulding the intermediate transition layer comprise these lugs. The protection means collaborates with the coating to limit the magnitude of the deformations to which the surrounding rubber is subjected and which are transmitted to the electronic device. The V-shaped geometry provides a progressive limitation of the amplitude. Specifically, the distance between each lug and the conductor increases with increasing distance away from the attachment part and this means that substantial deformations are absorbed far away from the attachment part and smaller deformations are absorbed close to the attachment part. This then reduces the fatigue on the conductor in the part for attachment of the conductor to the support, thus reducing the risks of the conductor breaking.

In one embodiment, the device comprises several intermediate transition layers.

For preference, each intermediate transition layer 30 has a 10% elongation modulus higher than the 10% elongation modulus of the transition layer it covers.

This then provides a progressive transition in rigidity between the rigidifying casing and the rubber in which the device is intended to be incorporated.

Another object of the invention is a method of manufacturing a device as defined hereinabove, in which:
  at least the part for attachment of the support and the part for attachment of the conductor are overmoulded,
  following the step of overmoulding the rigidifying casing, the rigidifying casing is at least partially overmoulded with an intermediate transition layer.

Advantageously, after the step of overmoulding the intermediate transition layer, the intermediate transition layer is at least partially overmoulded with an interface layer.

For preference, the electronic component is attached to a precursor of the support of the electronic component, each conductor is attached to the precursor of the support such that each conductor and the electronic component are electrically connected via the precursor of the support and each conductor is separated from the precursor of the support, the electronic component and the support electrically connecting each conductor and the electronic component.

The method of manufacturing the electronic device is therefore simple and can be automated, thus offering increased reliability at lower cost. Specifically, in order for the electrical connections to be functional, it is necessary for each conductor and the component to be positioned very accurately on the corresponding attachment parts which are electrically connected to one another. It is thus easy to achieve reliable positioning of the electronic component and of each conductor relative to one another because the precursor of the support is designed so that it allows accurate positioning of the precursor of the support with respect to an automatic installation that fits the electronic component and each conductor, thus guaranteeing the relative positioning of each component of the device. Optionally, the precursor of the support incorporates housings for each component, thus improving the positioning of the components.

For preference, the electronic component and each conductor are electrically connected for example by soldering, crimping, clipping or bonding or any other means.

Once the support has been separated from the remainder of the precursor of the support, the component and each conductor are still electrically connected to one another via the support. The support forms a sacrificial part of the support precursor. Finally, the precursor of the support allows the support to be positioned relatively simply in automated means that fits each conductor and the electronic component. Once the electronic component and each conductor have been attached to the support, the support bearing each conductor and the electronic component can be separated from the support precursor.

The support precursor therefore performs a function of positioning the various components relative to one another and a function of electrically connecting them by virtue of the support.

The support also confers rigidity upon the device once it has been separated from the support precursor. Further, the protective casing compensates for the loss of rigidity associated with the separation of the support from the support precursor.

Further, in the device of the prior art, the PCB support generally comprises several layers which, under the effect of stress, separate from one another through delamination. Delamination then leads to electrical malfunctioning of the device of the prior art. By using a support that is not laminated, for example that is a metal monolayer, any potential for delamination of the support is avoided.

Advantageously, the support comprises at least two parts for attachment of the electronic component, the support precursor being designed so that:
  prior to the separation step, the two parts for attachment of the electronic component are short-circuited via the support precursor, and
  following the separation step, the two parts for attachment of the electronic component are in open circuit.

In order to afford rigidity to the device and allow relatively accurate positioning of the component and of the conductors, the parts for attachment of the component are connected via the support precursor and are therefore short-circuited before the support is separated.

Once the component and each conductor have been attached to the support and once the latter has been separated, the two parts for attachment of the component need to be in open circuit in order to allow the device to work.

Advantageously, several precursors of several supports are formed by pressing and bending a metal strip.

The present application also relates to a precursor of a support for an electronic device intended to be incorporated into a tyre comprising an electronic component and at least one conductor, and comprising a support comprising:
- at least one part for attachment of the electronic component;
- at least one part for attachment of each conductor, which is electrically connected to at least one part for attachment of the electronic component via the support precursor;

the precursor of a support being arranged in such a way that the support can be separated from the support precursor by pressing and/or cutting.

As an option, the support precursor is designed so that:
- the two parts for attachment of the electronic component are short-circuited via the support precursor when the support is attached to the support precursor; and
- the two parts for attachment of the electronic component are in open circuit when the support is separated from the support precursor.

Another subject of the invention is a tyre comprising a device as defined hereinabove.

Advantageously, the 10% elongation modulus of the material of the interface layer is less than or equal to the 10% elongation modulus of the rubber in which the device is embedded.

BRIEF DESCRIPTION OF THE DRAWINGS

The invention will be better understood from reading the description which will follow, which is given solely by way of nonlimiting example and made with reference to the drawings in which:

FIG. 2 illustrates a device according to a first embodiment of the invention;

FIGS. 3 to 6 illustrate the device of FIG. 2 during steps of its method of manufacture;

FIGS. 14A to 14C depict various embodiments of a support for the device according to the invention.

DETAILED DESCRIPTION OF THE INVENTION

Figure 1:
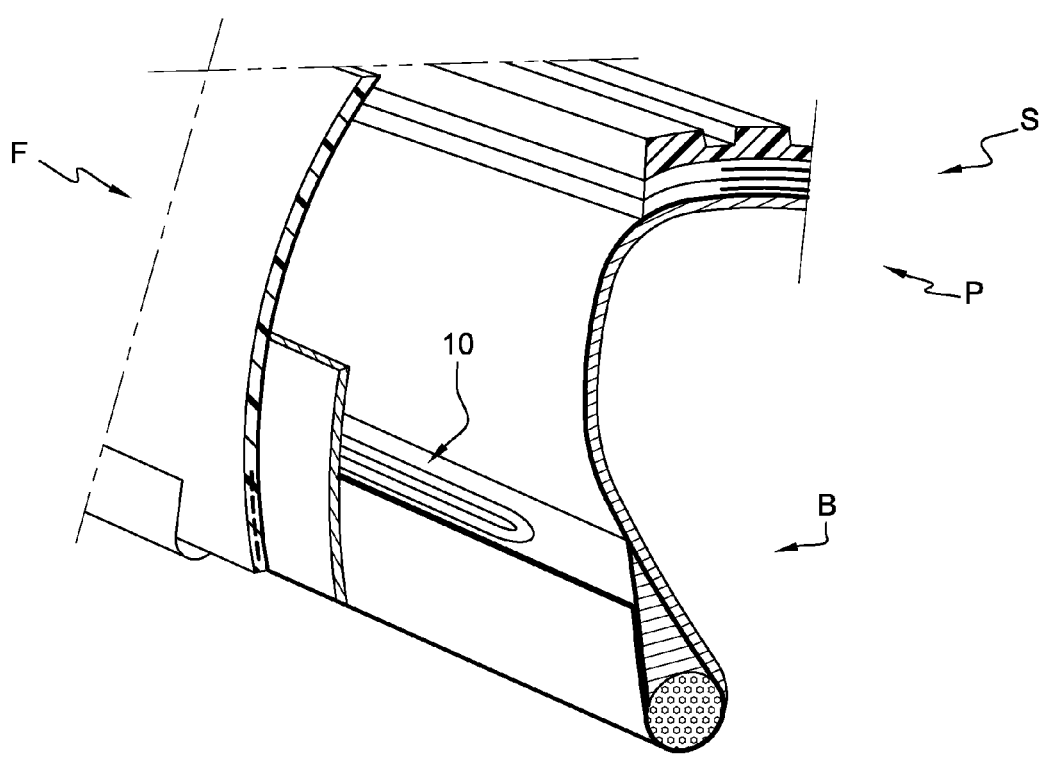
FIG. 1 is a perspective view of a tyre according to the invention, with a cutaway.

FIG. 1 depicts a tyre according to the invention denoted by the overall reference P.

In the conventional way, the tyre P comprises a crown S extended by two sidewalls F and two beads B. A single sidewall F and a single bead B are depicted in the figures. The known characteristics of the crown S, of each sidewall F and of each bead B are described in detail in the application published under number FR 2 914 585 and incorporated here by reference. More particularly, the bead B also comprises a device according to the invention, denoted by the general reference 10.

FIG. 2 depicts the electronic device 10 according to a first embodiment.

As illustrated in FIGS. 3 and 4, the device 10 comprises an electronic component 12 and two conductors 14, in this instance two antennas 14, forming a dipole. The electronic component 12 comprises a chip 16 of RFID type comprising pins 18 for attachment of the chip 16 to a support 20 of the device 10. Each conductor 14 is substantially rectilinear and has a helical shape defining the axial direction X of the device 10. The figures depict mutually orthogonal axes X, Y, Z corresponding to the axial (X), transverse (Y) and vertical (Z) orientations of the device 10.

The support 20, which has been separated from a precursor 22 of the support 20, comprises two parts 24A, 24B for attachment of the electronic component 12 to the support 20 and two parts 26A, 26B for attachment of each conductor 14 to the support 20. Each conductor 14 comprises a proximal part 14A for attachment of each part 26A, 26B and a radiating distal part 14B. Each conductor 14 and the support 20 are connected by the parts 14A and 26A, 26B. Each part 26A, 26B is electrically connected to each part 24A, 24B for attachment of the electronic component by a joining part 27 of the support 20. The two parts 24A, 24B for attachment of the electronic component 12 are in open circuit when the support 20 is separated from the support precursor 22.

With reference to FIG. 5, the device 10 comprises a rigidifying casing 28. The casing 28 is overmoulded directly onto the electronic component 12, the conductors 14 and the support 20. In this particular instance, the casing 28 completely and directly overmoulds the electronic component 12, the support 20, each attachment part 24A, 24B, 26A, 26B, each joining part 27 and each proximal part 14A for attachment of each conductor 14. In particular, the casing 28 is overmoulded over the junction formed by the parts 26A, 26B for attachment of the support 20 and the part 14A for attachment of each conductor 14.

As depicted in FIGS. 2 and 6, the device 10 comprises at least one intermediate transition layer 30 and one interface layer 32 for interfacing with the rubber of the tyre in which the device 10 is embedded. In this particular instance, the device 10 comprises a single intermediate layer 30. The intermediate layer 30 is overmoulded directly onto the casing 28 and onto each distal part 14B of each conductor 14. The intermediate layer 30 in this instance is fully overmoulded onto the casing 28. As an alternative, the device 10 comprises several intermediate transition layers 30. The interface layer 32 is overmoulded directly onto the outermost intermediate layer 30. The interface layer 32 here is completely overmoulded over the transition layer 30.

As illustrated in FIG. 5, the casing 28 comprises means 34 for centering the device 10 in a cavity used for overmoulding the intermediate layer 30. The intermediate layer 30 also comprises means 36 for centering the device 10 in a cavity for overmoulding the interface layer 32. The casing 28 finally comprises means 37 for protecting each conductor 14.

The means 37 is combined with the means 34. Specifically, the means 34 and 37 comprise lugs 38 arranged in an overall V-shape transversally on each side of each attachment part 26A, 26B. These lugs 38 provide for the axial and transverse positioning of the casing 28 and therefore of the device 10 in a cavity used for overmoulding the intermediate layer 30. The means 34 further comprises end stops 40 arranged on the casing 28 vertically on each side thereof.

The means 36 comprises end stops 42 overmoulded onto each part 14B of each conductor 14 and lugs 44 overmoulded onto the casing 28.

The casing 28 is made of a thermosetting plastic based, for example, on epoxy resins, on liquid crystal polymers (LCP) or on polybutylene terephthalate (PBT). This casing 28 is highly rigid, something that is made possible by virtue of the use of these thermosets. The crosslinking can be carried out during and/or after the operation of injecting the casing overmoulding material without the need for post-curing. Following complete crosslinking and separating of the support 20 from the support precursor 22, the casing 28 needs to be able to withstand all the mechanical stresses experienced by the device when the tyre is in use without appreciable deformation in order to guarantee correct electronic operation of the electrical connections between the electronic component 12, the conductors 14 and the support 20. The elastic modulus of the material of which the casing 28 is made is greater than or equal to 1000 MPa.

Each intermediate layer 30 and interface layer 32 is preferably made of a thermoplastic material such as thermoplastic elastomers or TPEs, for example styrene/butadiene (SB), styrene/butadiene/styrene (SBS), styrene/isoprene (SI), styrene/isoprene/styrene (SIS), styrene/isoprene/butadiene/styrene (SIBS), styrene/ethylene/butylene/styrene (SEBS), styrene/ethylene/propylene/styrene (SEPS), styrene/ethylene/ethylene/propylene/styrene (SEEPS) block copolymers, thermoplastic polyurethanes (TPU), TPV such as PP/EPDM-VD, and blends thereof. These materials need to be chemically compatible with and adhere well to the adjacent materials.

Each material of each transition layer 30 has a 10% elongation modulus of between 20 and 80 MPa. When the device 10 comprises several transition layers 30, each transition layer 30 has a 10% elongation modulus that is higher than the 10% elongation modulus of the transition layer 30 that it covers or overmoulds.

The 10% elongation modulus of the material of the interface layer 32 is less than or equal to the 10% elongation modulus of the rubber in which the device 10 is embedded. By way of example, the 10% elongation modulus of the material of the interface layer 32 is between 1 and 10 MPa. When the device 10 is positioned in a bead, as is the case of the tyre P of FIG. 1, the 10% elongation modulus of the material of the interface layer 32 is less than or equal to 5 MPa. When the device 10 is positioned in a sidewall, the 10% elongation modulus of the material of the interface layer 32 is less than or equal to 2 MPa.

A method of manufacturing the device 10 according to the invention will now be described with reference to FIGS. 7 to 12.

Figure 7:
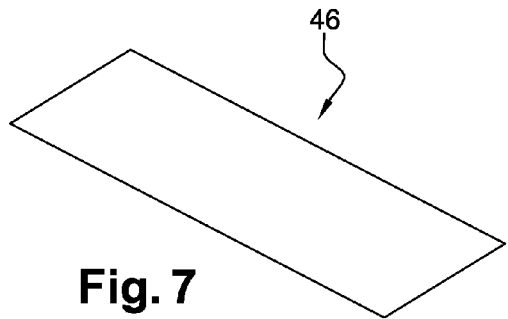
FIGS. 7 to 12 illustrate various steps in the manufacture of the device of FIG. 2.

Use is made of a metal blank 46, for example in the form of a strip of surface-treated brass as illustrated in FIG. 7.

Figure 8:
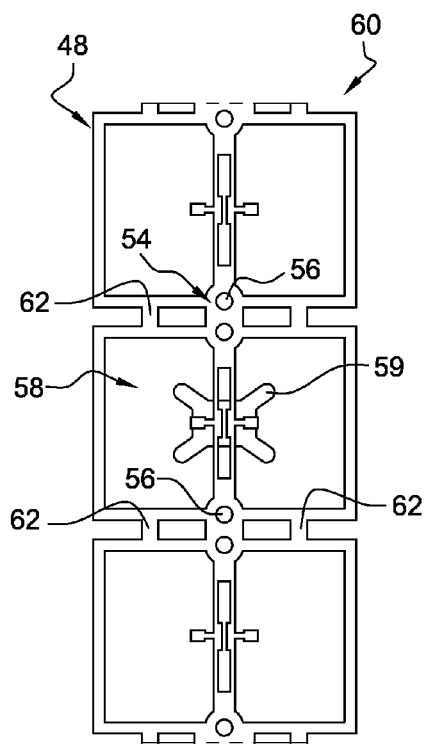

The method is implemented using an installation 48 for manufacturing the device 10, which installation is depicted in part in FIG. 8. The installation 48 comprises means (not depicted) for guiding the strip 46. The guide means comprises two guideways in which the strip 46 is slid.

The installation 48 also comprises pressing means (not depicted) exhibiting a pressing pattern by means of which the strip is periodically pressed. The installation 48 also comprises means for bending and folding the strip 46 (this means has not been depicted).

The installation 48 also comprises means 54 for centering and driving the strip with respect to the installation 48. The means 54 comprises pins 56 aligned substantially in the middle between the two guideways.

Finally, the installation 48 comprises an injection mould 58 for injection moulding the casing 28 and means for cutting the support 20 (this means has not been depicted). The injection mould 58 notably comprises a cavity 59 for moulding the casing 28.

The strip 46 is pressed using the pressing means to yield a pressed strip 60. This pressed strip 60 comprises several precursors 22 for several supports which are identical and joined together by joining portions 62.

Figure 9:
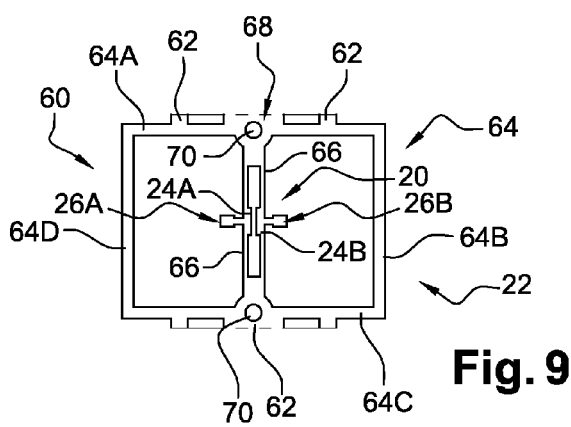

With reference to FIG. 9, each support precursor 22 comprises a rectangular surround 64 comprising four branches 64A-D that are parallel in pairs. Two branches of the surround, in this instance the branches 64A, 64C, are joined together by a middle branch 66 which is hollowed at its middle and is substantially parallel to the branches 64B, 64D. The support precursor 22 also comprises the support 20 which comprises the two parts 24A, 24B for attachment of the electronic component 12 and the two parts 26A, 26B for attachment of each conductor 14. In FIG. 9, the attachment parts 26 are still flat and the two parts 24A, 24B for attachment of the electronic component 12 are short-circuited via the support precursor 22 because the support 20 is secured to the support precursor 22. In addition, the support precursor 22 comprises means 68 for centering each support precursor 22 in the installation 48. The means 68 complements the means 54 and comprises two orifices 70 formed at the intersection between each branch 64A, 64C and the middle branch 66.

Figure 10:
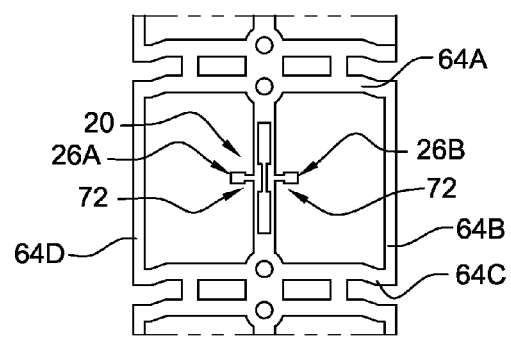

With reference to FIG. 10, during a step subsequent to the pressing step, each part 26A, 26B is folded to make a channel 72. The surround 64 is also bent so that the support 20 is raised up in relation to the branches 64B, 64D when the support precursor is resting on the branches 64B, 64D.

Figure 11:
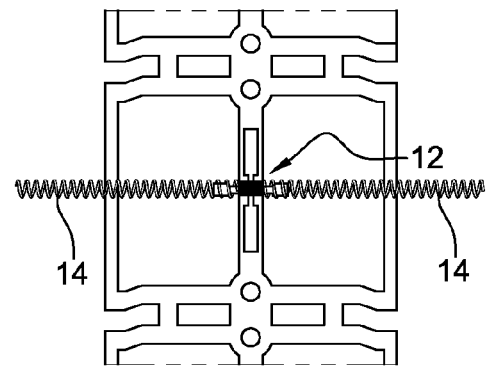

With reference to FIG. 11, the electronic component 12 and each conductor 14 are attached respectively to the parts 24A, 24B and 26A, 26B of the support 20. In this particular instance, a brazing paste is applied to each part 24A, 24B, 26A, 26B then each conductor 14 and the electronic component 12 are set in place and the brazing paste is melted to attach and electrically connect each conductor 14 and the electronic component 12 during a reflow soldering step.

Figure 12:
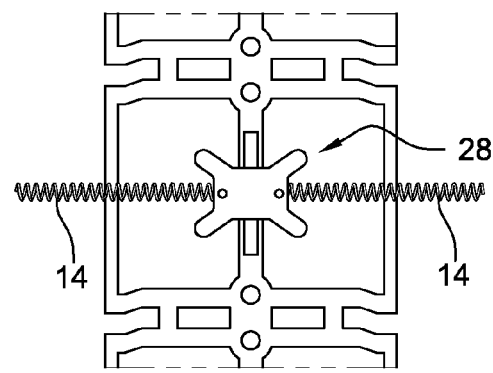

With reference to FIG. 12, the electronic component 12, the support 20 and each proximal part 14A for attachment of each conductor 14 are overmoulded with the casing 28 using the mould 58.

Next, the support 20 bearing the component 12, the conductors 14 and the casing 28 is separated from each support precursor 22 by cutting and/or pressing the support 20, in this instance each middle branch 66 transversely on each side of the device 10. This then yields an intermediate device 10 as depicted in FIG. 5.

Each intermediate device 10 of FIG. 5 is positioned in a mould for injection moulding the intermediate layer 30 and the layer 30 is overmoulded onto the intermediate device 10 of FIG. 5. This then yields the intermediate device of FIG. 6.

Next, each intermediate device 10 of FIG. 6 is positioned in an injection mould for injection moulding the interface layer 32 and the layer 32 is overmoulded onto the intermediate device 10 of FIG. 6. This then yields the device 10 of FIG. 2.

Figure 13:
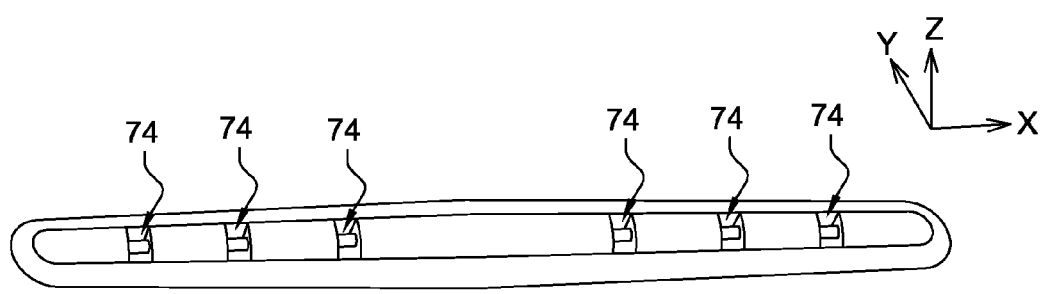
FIG. 13 is a view similar to that of FIG. 2 of a device according to a second embodiment of the invention.

FIG. 13 depicts a device 10 according to a second embodiment. Elements that are analogous to those depicted in the preceding figures are denoted by identical references.

In contrast to the first embodiment, the means 36 for centering the device 10 in the cavity used for overmoulding the interface layer 32 is not borne by the intermediate layer 30 but are borne by the mould. This means 36 notably comprises pairs of half-shells (not depicted) for positioning the intermediate device coated with the intermediate layer in the cavity used for moulding the layer 32. Once the device 10 has been removed from the mould, notches 74 remain, along each distal part 14B of each conductor at the points at which the positioning shells had been located. Of course, these notches no longer remain when the positioning means is retractable. In this embodiment, the layer 30 therefore does not necessarily have the lugs 42.

FIGS. 14A-C depict various embodiments of the support 20. Elements analogous to those depicted in the previous figures are denoted by identical references.

In FIG. 14A, each attachment part 26A, 26B has several tongues 76 for holding each conductor 14 on each attachment part 26A, 26B.

In FIG. 14B, in addition to the tongues 76 of the embodiment of FIG. 14A, the support 20 comprises at least one upstand 78 for protecting the electronic component 12, in this instance two upstands positioned transversely one on each side of each part 24A, 24B. Further, the support 20 comprises projections 80 for supporting each lug 38.

In FIG. 14C, in addition to the two parts 26A, 26B for attachment of the electronic component 12, the support 20 comprises a central support part 82 of the electronic component 12 which part is arranged between the two parts 26A, 26B and electrically insulated from each part 24, 26 when the support is separated from the support precursor 22.

The invention is not restricted to the embodiments previously described.

Specifically, the features of the various embodiments of the support 20 can be combined indifferently.

Further, the bending step may be done prior to the folding step, and vice versa.

In addition, the device 10 may comprise more than three layers in order to improve the transition in rigidity between the electronic component 12, the conductors 14 and the rubber of the tyre.

The electronic component 12 may be of the passive type, which means to say one capable of communicating data contained in an electronic chip to an external interrogation unit, or may be of the active type, which means to say one capable of receiving data emitted by a sensor in order to communicate it to an external interrogation unit. Such an active component may notably contain a microprocessor and a memory.

The invention claimed is:

1. An electronic device to be incorporated into a tyre, the electronic device comprising:
    an electronic component;
    a conductor;
    a multi-section support for the electronic component, a first section of the multi-section support being in an open-circuit arrangement with a second section of the multi-section support, wherein the first section of the multi-section support and the conductor are joined together by a first part for attachment of the conductor to the multi-section support and a second part for attachment of the first part to the conductor, and wherein the first part and the second part are distinct from the multi-section support;
    a rigidifying casing overmoulded over at least the first part and the second part; and
    an intermediate transition layer at least partially overmoulded over the rigidifying casing.

2. The device according to claim 1, wherein the rigidifying casing is fully overmoulded over the multi-section support and the electronic component.

3. The device according to claim 1, wherein an elastic modulus of a material included in the rigidifying casing is greater than or equal to 1000 MPa.

4. The device according to claim 1, wherein a 10% elongation modulus of a material included in the intermediate transition layer is between 20 and 80 MPa.

5. The device according to claim 1, further comprising an interface layer at least partially overmoulded over the intermediate transition layer.

6. The device according to claim 5, wherein a 10% elongation modulus of a material included in the interface layer is below 10 MPa.

7. The device according to claim 1, wherein the rigidifying casing includes a centering part used to center the device in an overmoulding cavity used for overmoulding the intermediate transition layer.

8. The device according to claim 1, further comprising a plurality of intermediate transition layers.

9. The device according to claim 8, wherein, of the plurality of intermediate transitions layers, a covering intermediate transition layer has a 10% elongation modulus higher than a 10% elongation modulus of a covered intermediate transition layer covered by the covering intermediate transition layer.

10. An electronic device to be incorporated into a tyre, the electronic device comprising:
    an electronic component;
    a conductor;
    a support for the electronic component, wherein the support and the conductor are joined together by a first part for attachment of the conductor to the support and a second part for attachment of the first part to the conductor, and wherein the first part and the second part are distinct from the support;
    a rigidifying casing overmoulded over at least the first part and the second part; and
    an intermediate transition layer at least partially overmoulded over the rigidifying casing,
    wherein the rigidifying casing includes a protector arranged to protect the conductor, the protector including two lugs arranged in an overall V-shape on each side of the first and second parts for attachment of the conductor to the support.

11. A method of manufacturing an electronic device to be incorporated into a tyre, the electronic device including an electronic component, a conductor, and a multi-section support for the electronic component, a first section of the multi-section support being in an open-circuit arrangement with a second section of the multi-section support, wherein the first section of the multi-section support and the conductor are joined together by a first part for attachment of the conductor to the multi-section support and a second part for attachment of the first part to the conductor, and wherein the first part and the second part are distinct from the multi-section support, the method comprising steps of:
    overmoulding at least the first part and the second part with a rigidifying casing, the electronic component being supported by the multi-section support, wherein the rigidifying casing includes a protector to protect at least a portion of the conductor, and wherein the protector includes two lugs arranged on each side of the first and second parts; and,
    after the step of overmoulding with the rigidifying casing, overmoulding the rigidifying casing at least partially with an intermediate transition layer.

12. The method according to claim 11, further comprising a step of, after the step of overmoulding with the intermediate transition layer, overmoulding the intermediate transition layer at least partially with an interface layer.

13. The method according to claim 11, further comprising steps of:

attaching the electronic component to the multi-section support, which is secured to a precursor of the multi-section support;

attaching the conductor to the multi-section support, which is secured to the precursor of the multi-section support such that the conductor and the electronic component are electrically connected via the precursor of the multi-section support; and separating the multi-section support from the precursor of the multi-section support such that the conductor and the electronic component are electrically connected via the multi-section support.

14. A tyre comprising an electronic device, the electronic device including:

an electronic component;

a conductor;

a multi-section support for the electronic component, a first section of the multi-section support being in an open-circuit arrangement with a second section of the multi-section support, wherein the multi-section support and the conductor are joined together by a first part for attachment of the conductor to the multi-section support and a second part for attachment of the first part to the conductor, and wherein the first part and the second part are distinct from the multi-section support;

a rigidifying casing overmoulded over at least the first part and the second part; and an intermediate transition layer at least partially overmoulded over the rigidifying casing.

15. The tyre according to claim 14, further comprising a rubber portion in which the electronic device is embedded, wherein the electronic device further includes an interface layer at least partially overmoulded over the intermediate transition layer, and wherein a 10% elongation modulus of a material included in the interface layer is less than or equal to a 10% elongation modulus of a rubber of the rubber portion in which the electronic device is embedded.

* * * * *

UNITED STATES PATENT AND TRADEMARK OFFICE
CERTIFICATE OF CORRECTION

PATENT NO. : 9,457,628 B2
APPLICATION NO. : 13/516926
DATED : October 4, 2016
INVENTOR(S) : Michel Robert Page 1 of 1

It is certified that error appears in the above-identified patent and that said Letters Patent is hereby corrected as shown below:

On the Title Page

REFERENCES CITED
FOREIGN PATENT DOCUMENTS: "WO WO2009056740 * 5/2009" should read
--WO WO2009/056740 * 5/2009--.

ABSTRACT
Line 2: "comprises," should read --component,--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*